Oct. 10, 1933.   W. C. MULLER   1,930,059
HYDRAULIC POWER TRANSMISSION MECHANISM
Filed Aug. 20, 1930   6 Sheets-Sheet 1
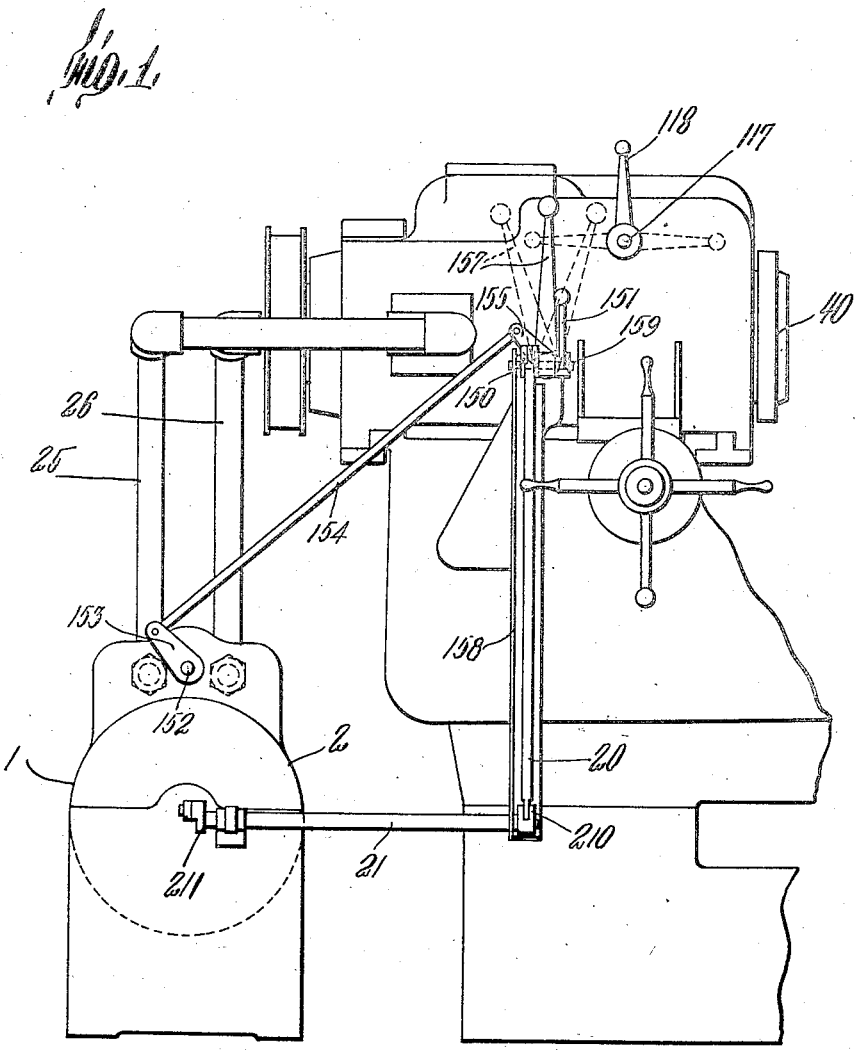

Oct. 10, 1933. W. C. MULLER 1,930,059
HYDRAULIC POWER TRANSMISSION MECHANISM
Filed Aug. 20, 1930 6 Sheets-Sheet 2
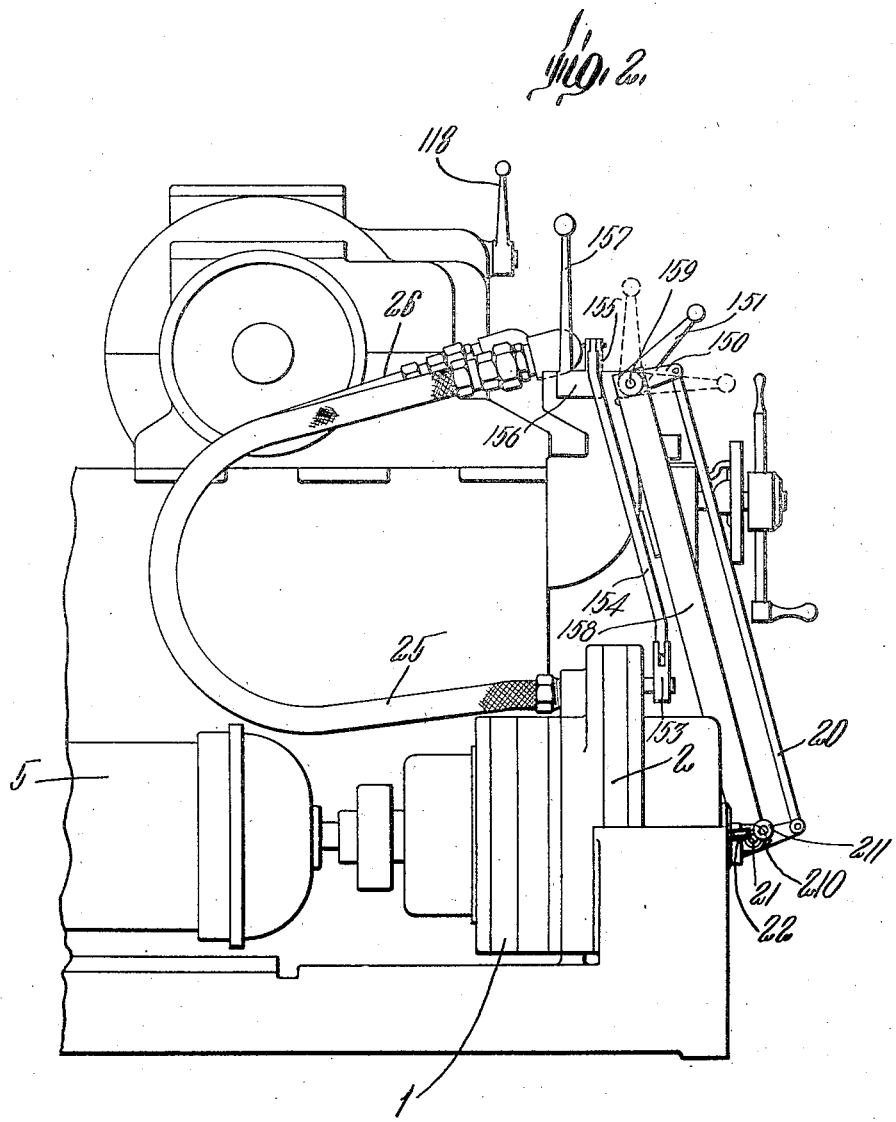

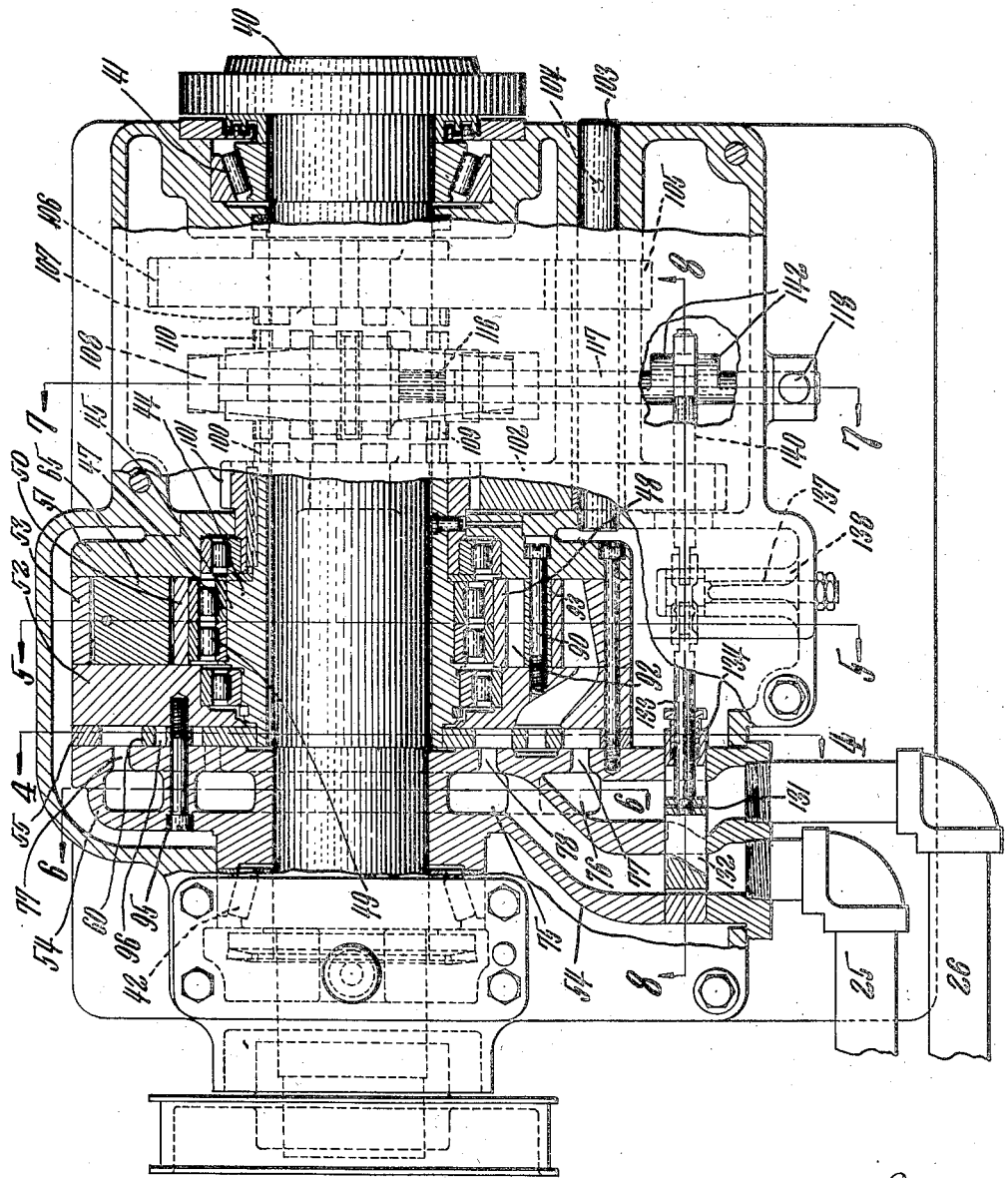

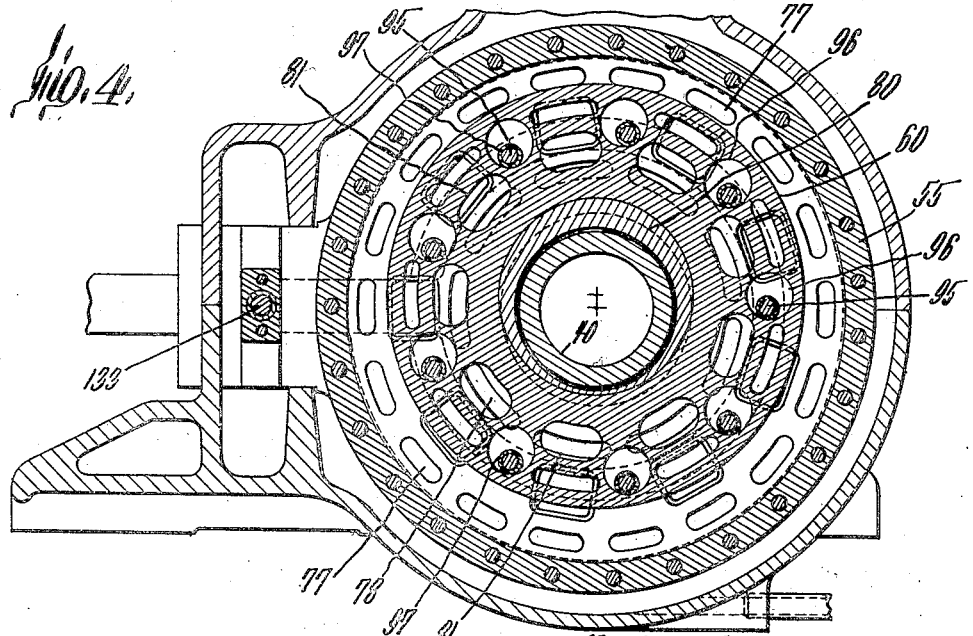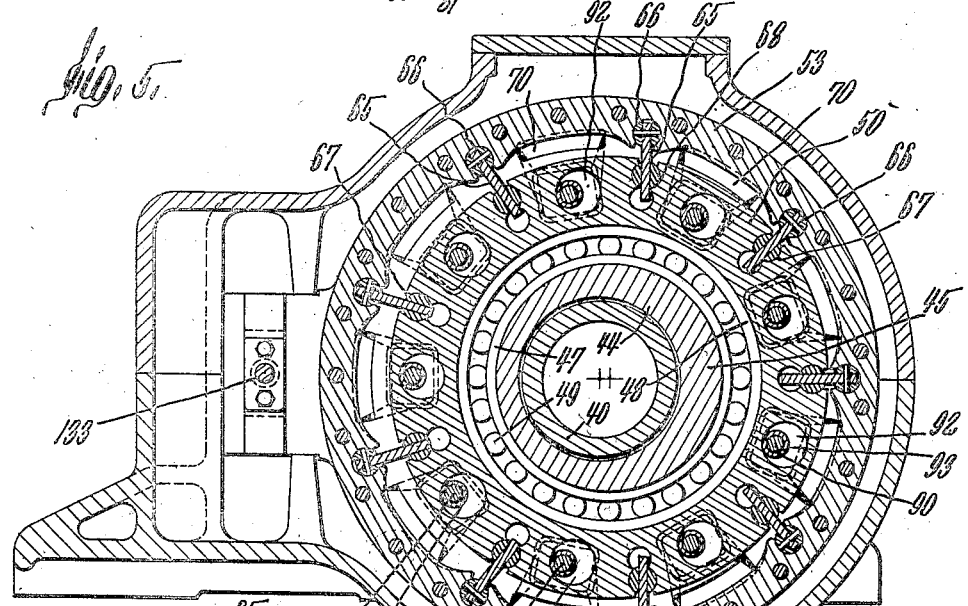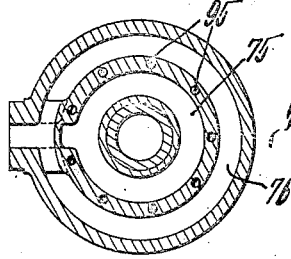

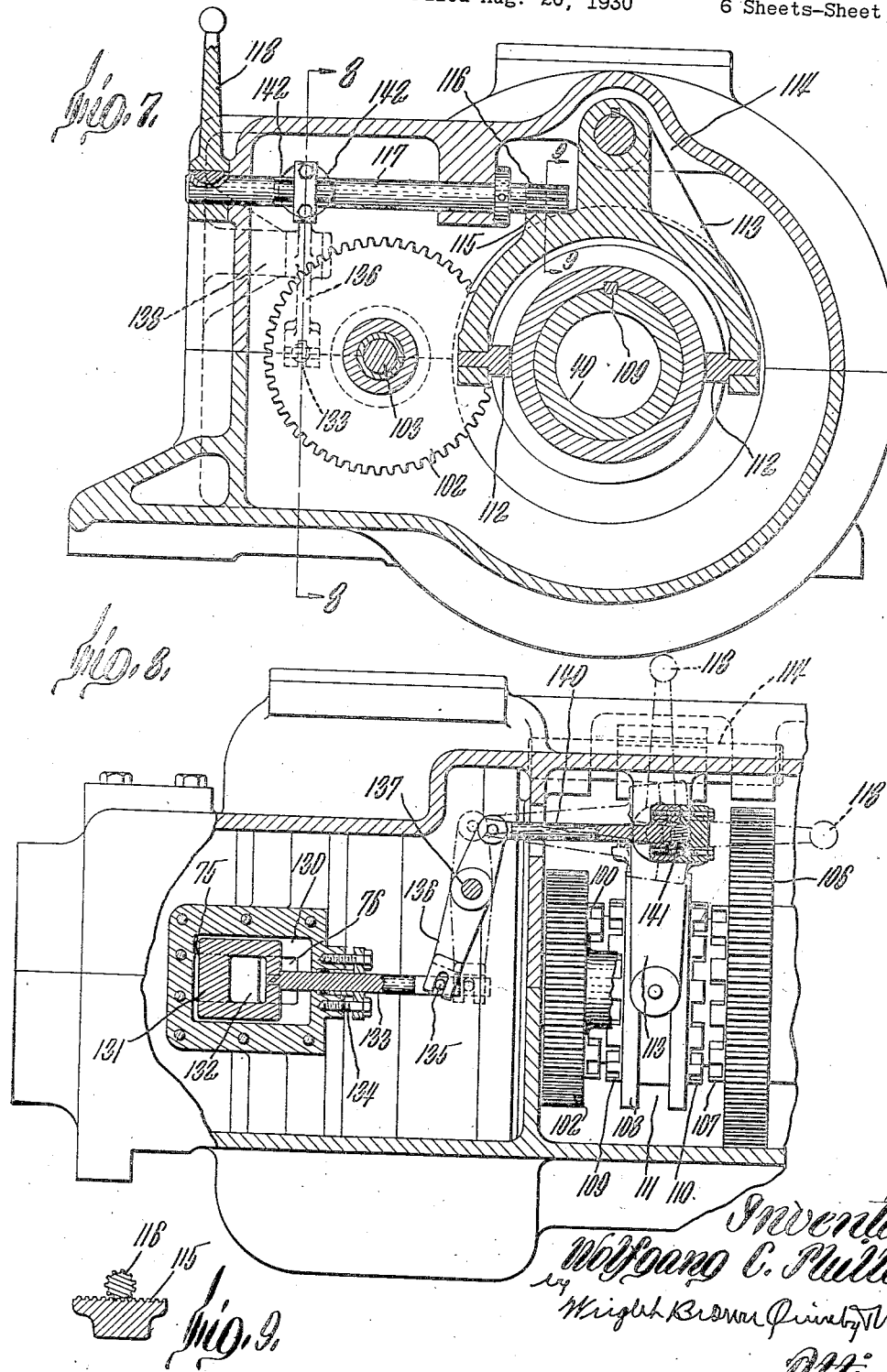

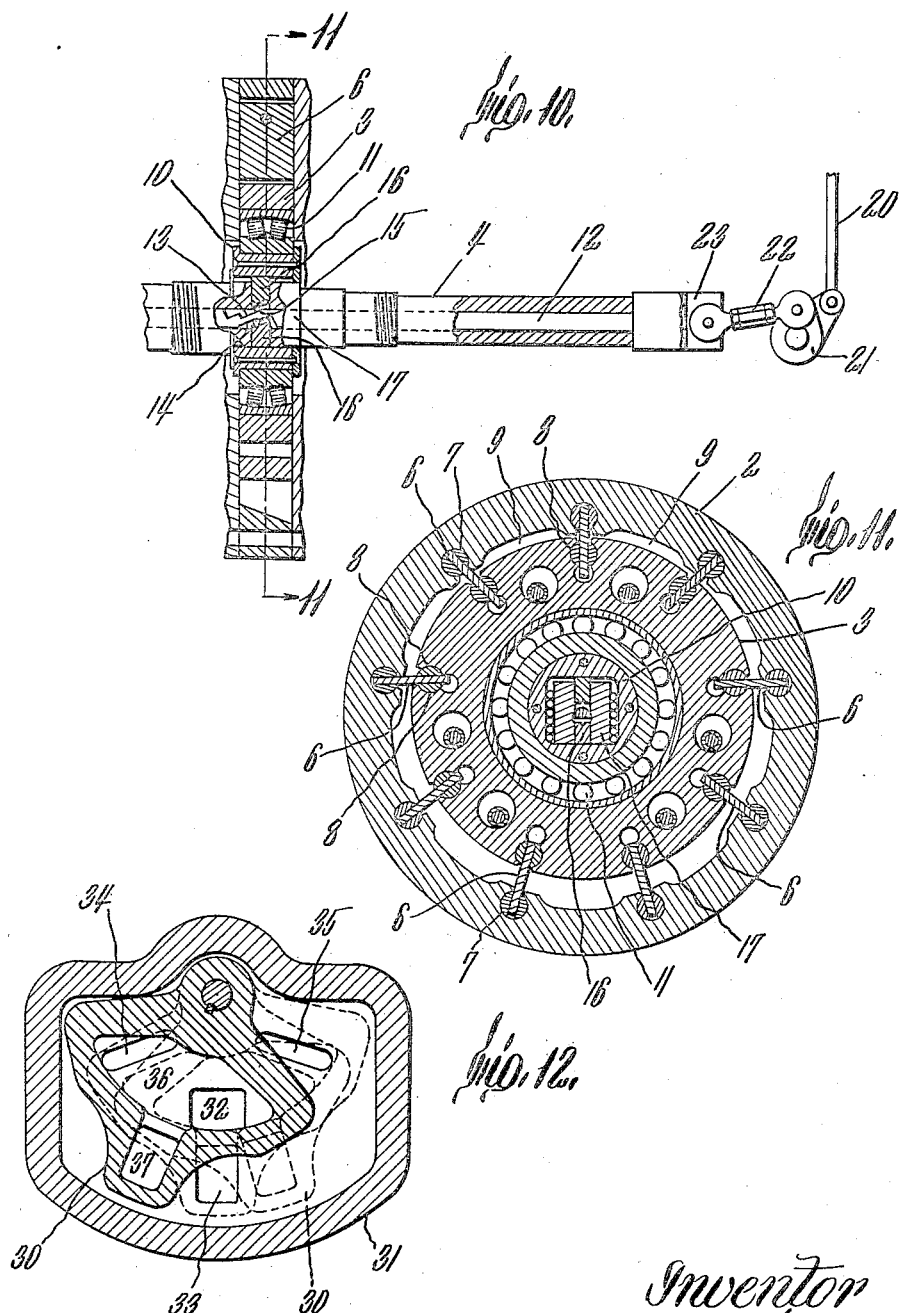

Patented Oct. 10, 1933

1,930,059

UNITED STATES PATENT OFFICE 1,930,059

HYDRAULIC POWER TRANSMISSION MECH-
ANISM

Wolfgang C. Muller, Springfield, Vt.

Application August 20, 1930. Serial No. 476,512

2 Claims. (Cl. 74—107)

This invention relates to hydraulic power transmission and more particularly to a transmission of this type particularly suitable for rotating a machine spindle such as a lathe or other mechine tool spindle. To this end the motor of the transmission mechanism is arranged to surround the spindle and to drive it directly without the interposition of gears, though if desired and in the preferred construction, it is arranged to selectively drive the spindle direct or through back gears by which the speed ratio between the spindle drive and the motor may be changed.

One feature of the invention, therefore, relates to means by which the change from direct to gear drive may be made readily at any time.

Further features of the invention relate to the control of the pump and motor units and to the construction of the motor unit.

For a more complete understanding of this invention, reference may be had to the accompanying drawings in which Figures 1 and 2 are fragmentary side and end elevations, respectively, of a lathe showing the transmission mechanism applied thereto.

Figure 3 is a plan partly broken away and in section of the motor unit.

Figures 4, 5, 6, 7 and 8 are sections on the correspondingly numbered section lines of Figure 3, Figure 8 being also a section on line 8—8 of Figure 7.

Figure 9 is a detail section on line 9—9 of Figure 7.

Figure 10 is a fragmentary section through the pump showing the mechanism for varying its rate of delivery by varying the eccentricity of the piston.

Figure 11 is a section on line 11—11 of Figure 10.

Figure 12 is a section through the reversing valve.

In Figures 1 and 2 application of a fluid-pressure power-transmitting mechanism for rotating a lathe spindle is illustrated. Referring to these figures, at 1 is indicated a pump unit which may be of any suitable type, but as shown is of the type more particularly described and claimed in my application for patent Serial Number 476,315, filed August 19, 1930, for Pump or motor for hydraulic power transmission system.

This pump has a suitable impeller which is shown more in detail in Figures 10 and 11. Within a front casing substantially cylindrical as at 2 is positioned an eccentric piston 3 constrained to move in an orbital path without rotation about its axis by rotation of a drive shaft 4 which may be actuated by a motor as shown at 5 in Figure 2. This piston 3 is shown as connected to the casing 2 by vanes 6, one end of each of which is rockably supported as at 7 in a socket in the casing and the other end of which is slidably and rockably supported between segmental pieces 8 in recesses in the piston, these vanes defining with the piston and the casing a plurality of chambers 9 which are alternately expanded and contracted by rotation of the shaft 4 which produces the bodily gyratory motion of the piston. The connection between the shaft and the piston comprises a disk member 10 eccentrically carried by the shaft 4 and imparting eccentric motion to the antifriction bearing 11 within the piston, which, however, is prevented from rotating about the shaft axis with the disk 10. The eccentricity of the disk 10, and therefore the amplitude of motion of the piston, and the resultant amount of contraction and expansion of the liquid chambers 9, is shown as controlled by the axial position of a rod 12 co-axial with and slidable axially through the shaft 4 and having inclined faces 13 and 14 bearing through balls 15 with members 16 having inclined inner ends projecting through openings in a squared portion 17 of the shaft 4 and carried by the disk 10. The position of this controlling rod 12 may be determined by manipulation of a rod 20 connected through rock arms 210 and 211 on a rock shaft 21 and a link 22 to a block 23 which rotatably supports one end of the rod 12.

The pump communicates through a pair of pipes 25 and 26 with the motor mechanism and in order that the operation of the motor may be stopped or started and its direction controlled, a valve means for controlling the supply of liquid under pressure from the pump to these pipes may be provided. Such a means is shown in Figure 12 which comprises an oscillatory valve 30 within a valve casing 31 into which the pump delivers through the port 32 and receives liquid through the port 33. The pipes 25 and 26 lead into this valve chamber through ports 34 and 35. The valve 30 has an opening 36 therethrough, which, when the valve is swung in one direction, as shown in full lines in this figure, opens the port 34 to the pump delivery port 32 and the port 35 to the pump intake port 33. It may also be rocked to an intermediate position which blanks the ports 34 and 35 and connects the port 32 with the port 33 through the extension portion 37, in which position the motor is stopped and the pump merely circulates the liquid idly. It may also be swung to the extreme right hand position as shown in Figure 12 by dotted lines, in which position the port 32 communicates with the port 35 and the port 34 communicates with the port 33, whereupon the direction of motion of the motor is reversed to that when the valve is in the full line position shown in Figure 12.

At 40 is shown a shaft constituting the usual spindle of a lathe mounted for rotation in end bearings 41 and 42 in the headstock of the machine and having any suitable nose portion to which work or tool supporting devices may be attached. Journaled on the spindle between the bearings 41 and 42 is a quill member 44 having intermediate its ends a circular extension 45 arranged with its periphery eccentric to the axis of the spindle 40. On this portion 45 is the inner raceway member 47 of an antifriction bearing, the outer raceway of which is shown at 48, rolls 49 being shown as positioned therebetween. This outer raceway 48 is carried by an annular piston 50. This piston is positioned in sliding contact between a motor end wall 51 and a partition 52 which are spaced apart about their peripheries as by a ring casing member 53. Another end wall 54 is spaced on the other side of the partition 52 as by a spacer ring 55 to form a valve chamber between the end wall 54 and the partition 52 in which an annular valve 60 is positioned.

As shown in Figure 5 the annular piston 50 is connected to the casing ring 53 by a plurality of vanes 65, each of which is shown as mounted for rocking movement in a cylindrical bearing within a socket 66 in the ring 53 and slidable between segmental members 67 mounted for rocking movement in a recess 68 in the piston, in this respect being identical with the mounting of the piston 3 of the pump. These vanes 65, together with the piston and the casing wall, define fluid-receiving chambers of variable capacity, the capacity alternately increasing and decreasing in circular series around the periphery of the piston as the spindle rotates.

The fluid under pressure is supplied from the pump and its admission to and exhaust from the several fluid chambers of the motor is controlled by the valve plate 60, thereby to cause a gyratory motion of the motor piston which causes a rotative motion of the eccentric rotatably supported therein. The fluid is supplied to and discharged from the several chambers through ports 70 extending therefrom through the partition 52 and opening on the valve plate side thereof. The pipes 25 and 26 leading from the pump communicate with concentrically arranged chambers 75 and 76 in the end plate 54. The chamber 75 communicates with the interior of the valve casing through an annular series of slots 77 and the chamber 75 communicates with the same valve chamber through another annular series of slots 78 positioned closer to the axis of the spindle 40. The valve plate 60 is supported on the eccentric 80 carried by the quill 44 so that the valve plate is caused to move in a circular path similar to that of the piston 50 as the quill is rotated, and in doing this it serially covers and uncovers the ports 70 leading to the several fluid pressure chambers outwardly of the piston to the ports 77 which lead to the pipe 26, and a series of openings 81 through the valve plate act to serially connect and obstruct flow between the ports 70 and the slots 78 which communicate with the pipe 25. Thus the valve plate serves to admit fluid under pressure to certain of the variable capacity liquid chambers 70 when they are in contracted condition thus expanding them, while those chambers which are being contracted are put in communication with the opposite pipe to permit the fluid therein to pass out to the intake side of the pump. Thus the motor piston is caused to be moved in its gyratory path, rotating the quill 44 and thus actuating the valve plate to continue such motion. The end plate 51 is shown as connected to the partition 52, whereby the construction may be stiffened, as by screws 90 extending through the end plate 51 through enlarged circular holes 92 through the piston and threaded into the partition 52. These screws 90 may have bushings 93 journaled thereon which may contact with the inner wall of the circular holes 92 and thereby to help to prevent rotation of the piston about the axis of the spindle 40.

Similarly the end plate 54 may be tied to the partition 52 by screws 95 passing through circular openings 96 through the valve plate and threaded into the partition 52. These screws 95 may also be provided with bushings 97 journaled thereon for bearing engagement on the edges of the valve plate holes 96.

Thus it will be seen that the quill 44 may be rotated in either direction and at any desired rate within the capacity of the pump by controlling the position of the rocking valve 30 and the amount of eccentricity of the pump piston, respectively. Means are provided whereby the rotation of the quill 44 may be caused to rotate the spindle 40 directly, or, if desired, by which the rotation of this quill may be transmitted to the spindle through back gearing by which a change in relative velocity of the quill and spindle may be produced. To this end one end of the quill 44 is shown as provided with clutch elements 100. The gear 101 is fixed to this quill member back of the clutch elements and this meshes with a gear 102 journaled on a back shaft 103 fixed in the headstock as by a pin 104. Fixed to rotate with the gear 102 on the shaft 103 is a pinion 105 which meshes with a gear 106 journaled on the spindle 40. Thus as the quill rotates, it imparts rotation to the gear 106 at a different angular velocity due to the relative sizes of the intermeshing gears in the train leading thereto. This gear 106 is provided with clutch elements 107 spaced from the clutch elements 100 of the quill and between these sets of clutch elements is positioned a double throw clutch member 108 which is provided with clutch elements 109 and 110 on opposite sides which may selectively be brought into engagement with the clutch elements 100 and 107 on sliding of the clutch member 108 axially of the spindle 40 in the proper direction for an intermediate position where it is out of engagement with both.

This clutch member 108 is keyed to the spindle as by the key 109 shown in Figure 7 and is provided with a peripheral groove 111 for the reception of oppositely disposed shoes 112 of a shifting fork 113. This shifting fork is shown as supported for movement axially of the spindle 40 on a bearing bar 114 to which it is slidably keyed, this bar being fixed to portions of the headstock. As shown in Figures 7 and 9, this fork is provided with rack teeth 115 with which meshes a pinion 116 fixed on a rocking shifting shaft 117 which may be actuated by a suitable handle 118 fixed to the end of the shaft 117 outwardly of the headstock casing. By rocking this shaft the quill 44 may be selectively connected directly to the spindle for direct rotation thereof or through the back gearing at a reduced rate of speed, though of course the back gearing could be arranged to give a higher rate of speed with a proper selection of gears should this in any case be found desirable.

In order that this shifting of the clutch mechanism may be accomplished at any time with great facility, means are provided by which the rate of motion of the quill may be reduced to a low value when the clutch mechanism is moved so that the mating clutch elements may be brought into proper registry easily and without class. To this end a valve mechanism shown in Figures 3 and 8 is illustrated. Referring to these figures, the passages 75 and 76, lead to a common valve chamber 130 within which is slidably mounted a valve 131 having a port 132 therethrough. This valve may be moved from the position shown in full lines in Figure 8 with one solid end portion nearly closing the port 75 and the other end portion partially closing the port 76 to a position wherein both ports 75 and 76 are substantially unobstructed. At 133 is shown an actuating rod for this valve which passes through a stuffing box 134 and at its outer end it is provided with a pin 135 with which is engaged the forked extremity of a lever 136 journaled on the upper end of a shaft 137 carried in a boss 138 projecting inwardly from the headstock casing. The opposite end of this lever 136 is connected through a link 140 with a crank pin 141 extending between crank arms 142 of the shaft 117. The angularity of these crank arms is so related to the angular position of the shaft 117 when the clutch is in neutral or unclutching position the valve is throttling the ports 75 and 76 and the flow in pipes 25 and 26 is short circuited so that most of the liquid has to return to the pump and very little passes through the motor, so that the speed of rotation of the quill and also of the gear 106 is low and the clutch 108 may be brought readily into clutching engagement with either of these parts. As the parts come into full clutching relation, however, the link 140 is moved to the left as shown in the dotted line position of Figure 8, thus withdrawing the valve from its throttling position and permitting the quill and the gear 106 to resume their normal speeds derived from the pump.

By the use of a fluid motor of the construction described, an exceedingly uniform torque is applied to the spindle, which is highly desirable particularly at the lower spindle speeds since this prevents variations in cutting rate. It also provides for maximum fluid flow within the dimensions of the motor which permits the unit pressure of driving fluid for a given driving power to be at a minimum, thus decreasing leakage losses which are also of greater importance at the lower driving speeds.

As shown the controls for regulating the speed and direction of rotation of the motor and for controlling direct or back gear connections between the motor and the spindle are all arranged accessible at a single operator's station. The speed and direction of motor rotation are controlled at the pump, the rod 20 leading to a crank 150 controlled by a handle 151 and the reversing valve carried by a rock shaft 152 being connected through a crank arm 153 and a link 154 to one arm 155 of a bell crank lever 156, the other arm 157 of which is formed as an actuating handle. An angle member 158 supports one end of the shaft 21 and the journal 159 of the crank arm 150. By positioning the reverse valve 30 at the pump unit, the pumping connections between the pump and motor are relieved from pressure when the reverse valve is in neutral position and they are not under pressure except when the motor is in operation.

From the foregoing description of an embodiment of this invention, it should be evident to those skilled in the art that various changes and modifications might be made without departing from the spirit or scope of this invention as defined by the appended claims.

I claim:

1. In combination, a shaft, an eccentric journaled on said shaft, an annular piston journaled on said eccentric, a casing enclosing said piston, means connecting said piston and casing defining therewith fluid chambers of variable capacity, and means for admitting fluid under pressure to and exhausting fluid from said chambers serially to expand and contract the same and cause rotation of said eccentric, and means for selectively driving said shaft from said eccentric at any of a plurality of speed ratios.

2. In combination, a machine spindle, a fluid actuated motor having an opening through which said spindle extends and having a rotary part, gearing, clutch means for selectively coupling said rotary part to said spindle either directly or through said gearing, a shaft rockable to control said clutch means to clutch said spindle to be directly driven in one angular position of said shaft and to be driven through said gearing in another angular position of said shaft, a valve movable in one direction to throttle the fluid flow through said motor and in the other direction to prevent such throttling, and connections from said valve to said rock shaft to cause rocking of said shaft between said positions to move said valve first in throttling and then in the opposite direction.

WOLFGANG C. MULLER.